(12) United States Patent
Wood et al.

(10) Patent No.: US 12,407,599 B2
(45) Date of Patent: Sep. 2, 2025

(54) SYSTEM AND METHOD OF PROVIDING A LOOSELY-COUPLED INTERFACE MODEL FOR OBTAINING UNDERLAY TRANSPORT SERVICE

(71) Applicant: Cisco Technology, Inc., San Jose, CA (US)

(72) Inventors: Steven Wood, Ottawa (CA); Jean-Marc Barozet, Le Perreux sur Marne (FR); Darren Russell Dukes, Ottawa (CA); Alberto Rodriguez-Natal, Mountain View, CA (US); Samir Thoria, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 81 days.

(21) Appl. No.: 18/390,422

(22) Filed: Dec. 20, 2023

(65) Prior Publication Data

US 2025/0211515 A1    Jun. 26, 2025

(51) Int. Cl.
| | |
|---|---|
| *G06F 15/16* | (2006.01) |
| *H04L 12/46* | (2006.01) |
| *H04L 45/037* | (2022.01) |
| *H04L 45/64* | (2022.01) |

(52) U.S. Cl.
CPC ........ *H04L 45/037* (2022.05); *H04L 12/4633* (2013.01); *H04L 45/64* (2013.01)

(58) Field of Classification Search
CPC .... H04L 45/037; H04L 12/4633; H04L 45/64
See application file for complete search history.

(56) References Cited

U.S. PATENT DOCUMENTS

| | | | |
|---|---|---|---|
| 2018/0295180 A1* | 10/2018 | Yang | G06F 8/61 |
| 2019/0190746 A1* | 6/2019 | Lee | H04L 12/4641 |
| 2020/0213227 A1* | 7/2020 | Pianigiani | H04L 41/0226 |
| 2021/0281444 A1 | 9/2021 | Srivatsan et al. | |
| 2021/0320878 A1 | 10/2021 | Young et al. | |
| 2023/0025586 A1 | 1/2023 | Rolando et al. | |

* cited by examiner

*Primary Examiner* — Razu A Miah
(74) *Attorney, Agent, or Firm* — Polsinelli P.C.

(57) ABSTRACT

A device transmits, from an overlay service controller associated with an overlay network to an underlay service controller associated with an underlay network and via a semantic structure defined for a service usage API, a request for a service offered by the underlay network. A device may receive, at the overlay service controller, from the underlay service controller and via the service usage API, attachment metadata. A device may map, based on the attachment metadata and via the overlay service controller, an overlay network tunnel to the service in the underlay network to generate an overlay tunnel mapping, wherein the overlay service controller does not have knowledge of details about implementing the service in order to enable the overlay network to consume the service offered by the underlay network. A device may communicate tunneled packets from the overlay network to the underlay network via the overlay tunnel mapping.

17 Claims, 6 Drawing Sheets

SYSTEM AND METHOD OF PROVIDING A LOOSELY-COUPLED INTERFACE MODEL FOR OBTAINING UNDERLAY TRANSPORT SERVICE

TECHNICAL FIELD

This disclosure relates generally to provisioning services requested at a server or transport layer from a client or an overlay layer and more specifically to a client-server semantic application programming interface (API) to enable overlay network tunnels to be mapped to specific predefined services or paths in the transport layer based on attachment metadata communicated between the client and the server via the API.

BACKGROUND

In the past, consumption of different network services from an underlay layer having an underlay service controller has been strongly coupled in the network-layer data plane and control plane through protocol-based interworking. Basic data which is required for control and data plane operation are exchanged between an overlay service controller and an underlay service controller for enabling the client or overlay layer to obtain underlying services.

Typically, a customer who desires to consume network services might receive tools and materials and the customer would map the traffic to the appropriate underlay network service from the tools and materials. Such services are being consumed directly at the network layer based on the known intent of the service as communicated from the tools and materials provided by the service provider. These tools and materials need to be processed by a human to consume the service. As a conceptual example, instead of building a car (as an example of a network service), the consumer may have just bought the car to drive it. The problem is that in some situations, the network service provider does not know what the intent is of the service. Of course, one knows what the intent of using the car is for driving and it would be clear to a human to tell them what the intent is, because the human has to drive the car. If a robot was driving the car, it would be difficult to tell the robot what the car does.

BRIEF DESCRIPTION OF THE SEVERAL VIEWS OF THE DRAWINGS

Illustrative examples of the present application are described in detail below with reference to the following figures.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Disclosed herein is a structured way that machines can talk to machines (or service orchestrators to talk to service orchestrator) to enable the consumption of underlay network services in a way to enable the orchestrators to know what the services are and how to basically build them or attach to them. The exchange of data disclosed herein enables the intent of the service to be known in a structured way so that the necessary logic can be implemented to deliver the service. The client machine (overlay service orchestrator) will get semantic data of the underlay service from the server machine (underlay service orchestrator) upon request. These data will be used to define the appropriate mapping service. The semantic data can be used to implement the service in the overlay controller.

In some aspects, the techniques described herein relate to a method including: transmitting, from an overlay service controller associated with an overlay network to an underlay service controller associated with an underlay network and via a semantic structure defined for a service usage application programming interface (API), a request for a service offered by the underlay network; receiving, at the overlay service controller, from the underlay service controller and via the service usage API, metadata; mapping, based on the metadata and via the overlay service controller, an overlay network tunnel to the service in the underlay network to generate an overlay tunnel mapping, wherein the overlay service controller does not have knowledge of details about implementing the service in order to enable the overlay network to consume the service offered by the underlay network; and communicating tunneled packets from the overlay network to the underlay network via the overlay tunnel mapping.

In some aspects, the techniques described herein relate to an overlay service controller associated with an overlay network including: one or more processor; and a computer-readable storage medium storing instructions which, when executed by the one or more processor, cause the one or more processor to: transmit, to an underlay service controller associated with an underlay network and via a semantic structure defined for a service usage application programming interface (API), a request for a service offered by the underlay network; receive, from the underlay service controller and via the service usage API, metadata; map, based on the metadata, an overlay network tunnel to the service in the underlay network to generate an overlay tunnel mapping, wherein the overlay service controller does not have knowledge of details about implementing the service in order to enable the overlay network to consume the service offered by the underlay network; and communicate tunneled packets from the overlay network to the underlay network via the overlay tunnel mapping.

In some aspects, the techniques described herein relate to a method including: receiving, at an underlay service controller associated with an underlay network and from an overlay service controller associated with an overlay network and via a semantic structure defined for a service usage application programming interface (API), a request for a service offered by the underlay network; transmitting, to the overlay service controller, from the underlay service controller and via the service usage API, metadata, wherein the overlay service controller, based on the metadata, maps an overlay network tunnel to the service in the underlay network to generate an overlay tunnel mapping, wherein the overlay service controller does not have knowledge of details about implementing the service in order to enable the overlay network to consume the service offered by the underlay network; and receiving tunneled packets from the overlay network and at the underlay network via the overlay tunnel mapping.

In some aspects, the techniques described herein relate to an underlay network including: an underlay service controller; one or more processor; and a computer-readable storage medium storing instructions which, when executed by the one or more processor, cause the one or more processor to: receive, at the underlay service controller and from an overlay service controller associated with an overlay network and via a semantic structure defined for a service usage application programming interface (API), a request for a service offered by the underlay network; transmit, from the underlay service controller, to the overlay service controller and via the service usage API, metadata, wherein the overlay service controller, based on the metadata, maps an overlay network tunnel to the service in the underlay network to generate an overlay tunnel mapping, wherein the overlay service controller does not have knowledge of details about implementing the service in order to enable the overlay network to consume the service offered by the underlay network; and receive tunneled packets from the overlay network via the overlay tunnel mapping.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

Description of Example Embodiments

Disclosed herein are systems, methods, and computer-readable media for innovations which focus on an API-based consumption model that allows overlay networks to discover underlay transport services at the management layer and then map overlay tunnels to specific underlay services, taking advantage of valuable SP services in a loosely-coupled model that shields the client from the implementation details of the network service making for simple integration of service providers transport services.

There is a lack of data that can be exchanged beyond that and the intent of the network service is not communicated at all for consumption by controllers or orchestrators between overlay networks and underlay networks. In order to achieve service agility and on-demand consumption models in traditional wide area networks (WAN), there is a need for the API-based network service consumption that can achieve automated service consumption in a loosely-coupled model that shields the client from the implementation details of the network service. In addition, structured service metadata can be used by client policy engines to compute and implement traffic mapping, security posture, access control and many other client layer services.

In addition, network overlays such as a software-defined wide area network (SD-WAN) are becoming ubiquitous. The overlay networks go over-the-top and do not allow for private transport service differentiation, thereby commoditizing transport networks. The proposed approach changes the existing model and allows tunnels in the overlay network to be mapped to specific paths in the service provider transport layer that can deliver differentiating transport services and also allow transport service metadata to be used in policy creation at the overlay layer.

There are many network service APIs that currently exist. Some such are Metro Ethernet Forum (MEF) standards for carrier ethernet and SD-WAN network services. These APIs tend to focus on building the transport network connections themselves to achieve a particular connectivity service. The proposed approach is different in that the techniques embodied allow a client in the overlay network to consume services that are already built (e.g., a service layer API).

Many service orchestrators (network service orchestrators) can create service models that can be used to create APIs for consumption. However, there are no such service APIs that are targeted at client-server type semantics and configured between different network services (such as the overlay network to the underlay network) that establish both service connection as well as policy intent. These elements can be combined as described herein to provide a proper architecture for loosely-coupled network service consumption.

Figure 1:
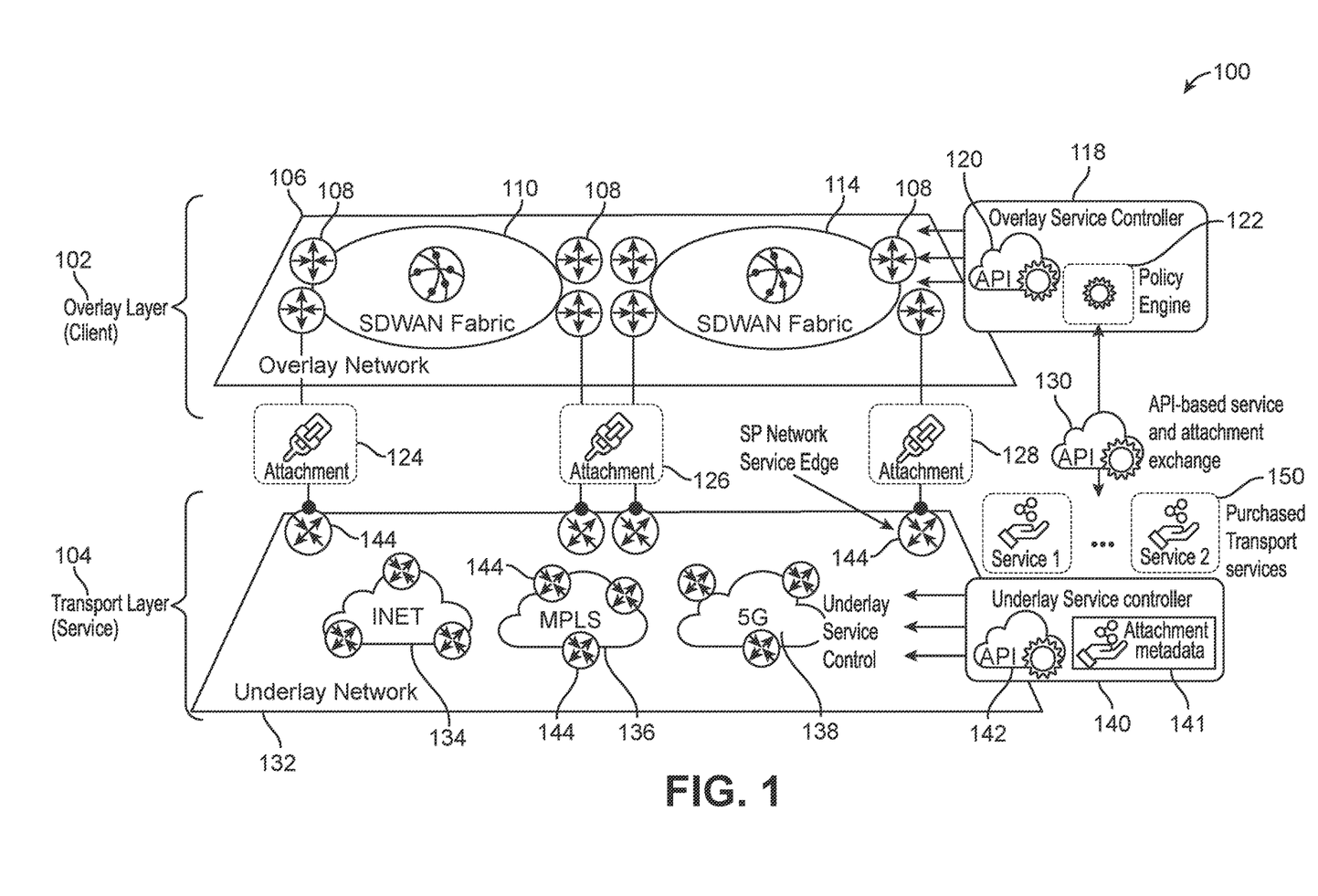
FIG. 1 illustrates an overlay-underlay for loosely-coupled service provider network services in accordance with one aspect of this disclosure.

FIG. 1 illustrates a layered network architecture 100 that includes an overlay layer 102 and a transport layer 104. FIG. 1 illustrates the use of an overlay-underlay network integration that provided for a loosely-coupled approach to enable access by clients in an overlay layer 102 to service provider (SP) network services such as purchased transport services 150. The network 100 can include a client-server semantic embodied in an API-based service/attachment metadata exchange 130 for the consumption of network services by orchestration applications or infrastructure as code (IaC)-based methods. FIG. 1 illustrates the layered architecture 100 and how it is desired to have a mapping between overlay tunnels and transport services such that an individual tunnel is mapped to and receives the service treatment desired from the transport layer 104 or underlay network 132. Envisaged services could be bulk data service, low latency service, threshold-cost-based connect (spot pricing of BW), geo-fenced paths, service-chaining, among many others that could be designed and envisaged in the underlay network 132. By way of example, an internet or INET service 134, a multiprotocol label switching service 136 and a 5G cellular service 138 are shown by way of example. Each such service includes a network service edge associated with the service and associated with an edge of the underlay network 132 for communication view tunnels and a respective first attachment circuit 124, a second attachment circuit 126 and a third attachment circuit 128 to clients in an overlay network 106 that is part of the overlay layer 102. One or more provider edge (PE) 144 provide access to the various portions of the underlay network 132. For example, a tunnel can attach the INET service 134 to a first software defined wide area network fabric 110 and/or a second software-defined wide area network fabric 114. Note features 110, 114 also references a number of "APPs" or applications. Various components such as one or more SD-WAN edge 108 are shown as well. The reference to numerous applications is to highlight that this approach is not limited to a SD-WAN fabric but can apply any application use of applications that need services from the transport layer 104 to accomplish tasks.

The goal is to allow an overlay service controller 118 to provision such service connections and the policies for service usage via the API-based service/attachment metadata exchange 130. The API-based service/attachment metadata exchange 130 communicates data between the overlay service controller 118 and an underlay service controller 140. In the exchange of data, the underlay service controller 140 can receive attachment metadata 141 or generate the attachment data 141 for sharing with the overlay service controller 118. Today, such mappings are hard-coded in each domain using imperative configuration and network control protocols to negotiate the connection. In many cases, higher level service intent cannot even be communicated in a machine-to-machine fashion. The use of the API-based service/attachment metadata exchange 130 to consume service provider transports service in this manner is a novel use of APIs. The overlay service controller 118 can be any application controller and is meant to be generic in the sense that it is not limited to SD-WAN fabric 110, 114 but to any application. The underlay service controller 140 can also be represented as any network service controller as well.

An overlay service controller API 120 can be provided to interface with the various SW-WANs 110, 114 in the overlay network 106. Further, a policy engine 122 can be used to implement policies associated with the overlay network 106 and by the overlay service controller 118.

Note that while the SD-WAN fabric 110, 114 is shown, the disclosure is not limited to that example. A mapping service could be created or some other kind of service that would use the transport layer 104 as a transport mechanism to deploy its mapping service. One could build an application layer service instead of an SD-WAN fabric 110, 114 that runs on top of the underlay network 132. The disclosed method could be used to basically provision connections and service types in the underlay network 132 in order to communicate client to application, or application to application.

The underlay service controller 140 includes an underlay service controller API 142 that is used to control, provision and manage various services offered by the underlay network 132. Various purchased transport services 150 are illustrated as available in FIG. 1.

The API-based consumption model allows overlay networks 106 to discover underlay transport services at the transport layer 104 associated with the underlay network 132 and then map overlay tunnels to specific underlay services 150. The approach takes advantage of valuable service provider services in a loosely-coupled model that shields the client in the overlay network 106 from the implementation details of the network service making for simple integration of service provider transport services 150.

The disclosed concepts enable applications to consume specific underlay services from the underlay network 132 in the overlay network 106. It can be specific to an SD-WAN application but also can apply to other non-tunnel based applications. If a person is writing an application that needs to consume a specific service, before the application tunnels are established from the overlay network 106 to the underlay network 132, the applications don't care about the underlying service in the underlay network 132 and the network can't do anything with that traffic because it is in a tunnel but applications that use the disclosed method can consume specific underlay services instead of just being over the top. Over the top means that all the application cares about are the two endpoints from a connectivity perspective. If an application can send traffic to the endpoint, that is all the application cares about. Everything else (e.g., who owns the equipment, who owns the network, etc.) does not matter to the application because all the application consumes connectivity. With this disclosure, the application can consume a specific service in the underlay even though connectivity is via a tunnel. When the application tunnels data, the service provider from the underlay network 132 cannot see inside what the traffic is and therefor cannot always prioritize. In this case, the approach enables the ability to attach the tunnel directly to a specific service whereas before the only thing that could be signaled in the network was the priority of the traffic. One could put the traffic in a queue that would determine if the application got a good quality of service or just a bulk quality of service. Now, one can actually say with the chosen service, one can request a service that avoids paths that go through China or avoids paths through a certain geographic area (See FIG. 2 for path diversity) and the application can consume more granular and different types of services in the underlay network 132 than just traffic prioritization.

Figure 2:
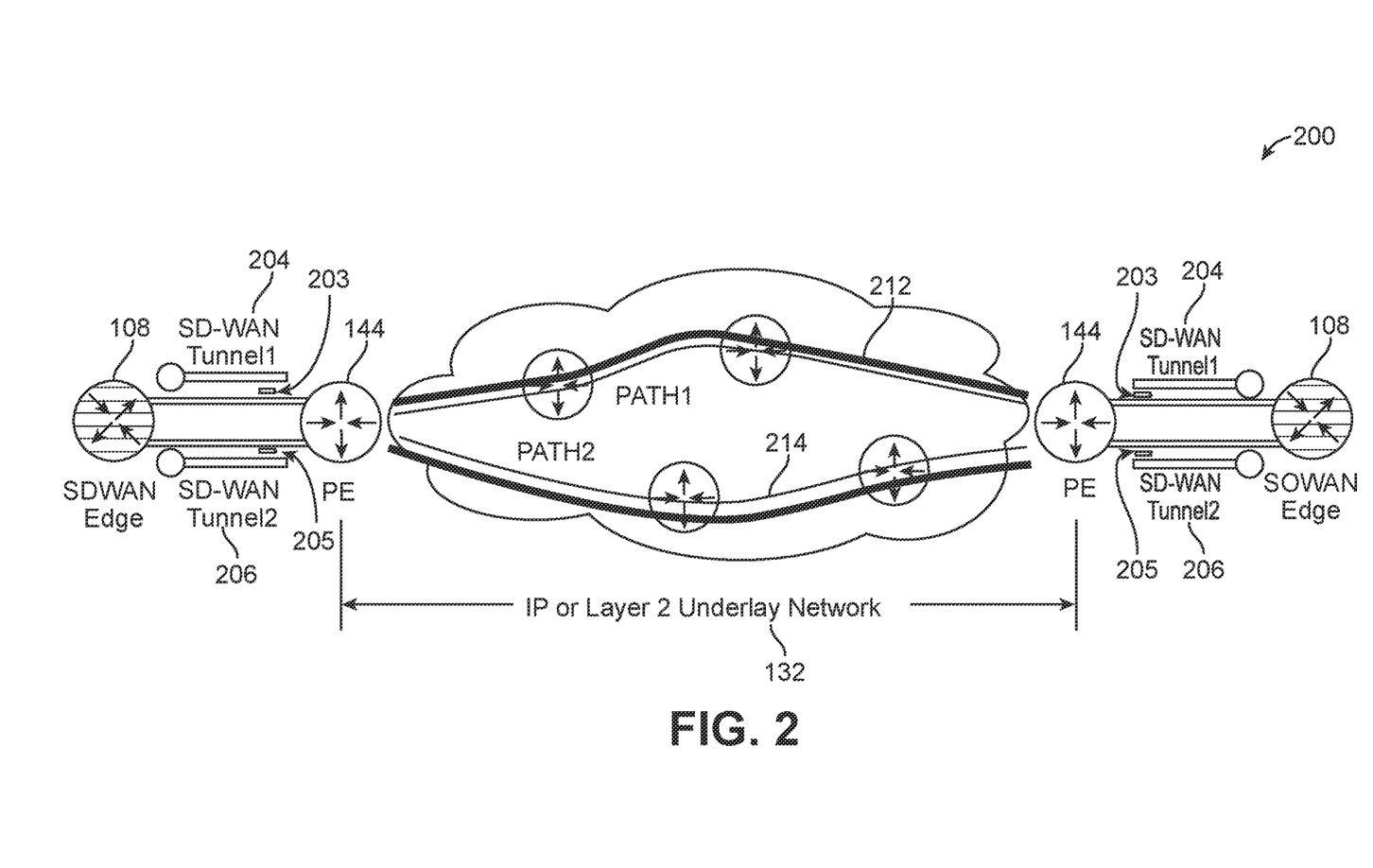
FIG. 2 illustrates an aspect of the subject matter in accordance with one aspect of this disclosure.

FIG. 2 illustrates a tunnel mapping framework 200 which includes a first software-defined wide area network (SD-WAN) edge 202, a first SD-WAN tunnel 204 and a second SD-WAN tunnel 206. FIG. 2 illustrates the concept of path diversity, which can be a service which provides benefits for some applications. A first provider edge 208 provides access to the underlay network 132. Within the underlay network 132, a first path 212 and a second path 214 can be defined to a second provider edge 216 which provides via the first SD-WAN tunnel 204 and the second SD-WAN tunnel 206 access to the second SD-WAN edge 222. The disclosed concepts enable (but are not limited to) overlay network tunnels (such as SD-WAN or IPSec) to be mapped specific predefined services or paths in a service provider network or underlay network 132. The mapping would be accomplished via either packet metadata (e.g., differentiated services code point (DSCP) in outer header) in a client packet provided in the API-based service attachment metadata exchange 130 from the overlay service controller 118 or a mapping to specific attachment circuit (e.g., a virtual local-area network (VLAN)) that would be locally significant to the network-to-network interface. In another aspect, an underlay service controller can deliver a key that an ingress provider edge (PE) 208 uses to map to the appropriate service. The attachment metadata would be communicated or discovered via the API-based service/attachment metadata exchange 130, which the overlay service controller 118 could then use to establish the overlay tunnel mapping shown in FIG. 2. The transport layer 104 would be responsible for delivering the subscribed service for the tunneled packets and the overlay network controller 118 does not need to know the details of the service implementation to consume the service. The disclosure would allow any type of client application stack to interface to the desired network service via the API-based service/attachment metadata exchange 130.

Several other aspects of the diverse tunneling feature shown in FIG. 2 includes the following. An SD-WAN tunnel (e.g., either the first SD-WAN tunnel 204 and/or the second SD-WAN tunnel 206) can be mapped to a specific service on the service provider edge 208 via packet metadata carried in a packet transmitted on the API-based service/attachment metadata exchange 130. The packet metadata can be contained in an Internet Protocol (IP) or Layer 2 (L2) header field such as local VLAN attachment circuit. The attachment may be virtual or physical in nature or by another metadata identifier in the packet/frame header.

In some aspects, the attachment metadata 141 can include two more mort parts. A first attachment metadata for example might enable access to a first portion of the underlay network 132 and a second attachment metadata might enable access to a second portion of the underlay network 132. The different portions of the underlay network may combine to provide the same service to the overlay network. For example, the overlay network controller 118 may enable access to the same service provided by the underlay network 132 (e.g., a low latency service for example) by using a first attachment metadata including certain DSCP values on a particular part of the underlay network 132. Further, second attachment metadata can be associated with a virtual large area network (VLAN) circuit that is configured on second part of the underlay network 132. The use of the attachment metadata in general can enable providing a service that spans different portions of the underlay network 132. In some aspects, the overlay network controller 118 can access the same service provided by an underlay network (e.g. low latency service) by using e.g. certain DSCP values on a particular part of the network, while using for example certain VLAN circuits on another part of the network.

Tunnel packets can be mapped to the services in the underlay network 132 by the ingress service provider edge 208 in the domain of the underlay network 132 or underlay service provider.

Details on how the underlay service is delivered to each tunnel (e.g., either the first SD-WAN tunnel 204 and/or the second SD-WAN tunnel 206) are unnecessary to the SD-WAN domain or the overlay network 106. In this manner, the integration of the overlay network 106 and the underlay network 132 is "loosely coupled" to enable access for clients in the overlay network 106 to access services available in the underlay network 132 through the exchange of data between the overlay service controller 118 and the underlay overlay service controller 118.

In one aspect, state and transport mechanisms to deliver the service such as one of the purchased transport services 150 are left isolated to the underlay network 132 or underlay service domain. An SD-WAN overlay layer map can direct tunnels over the attachment circuits to the underlay network 132.

Figure 3:
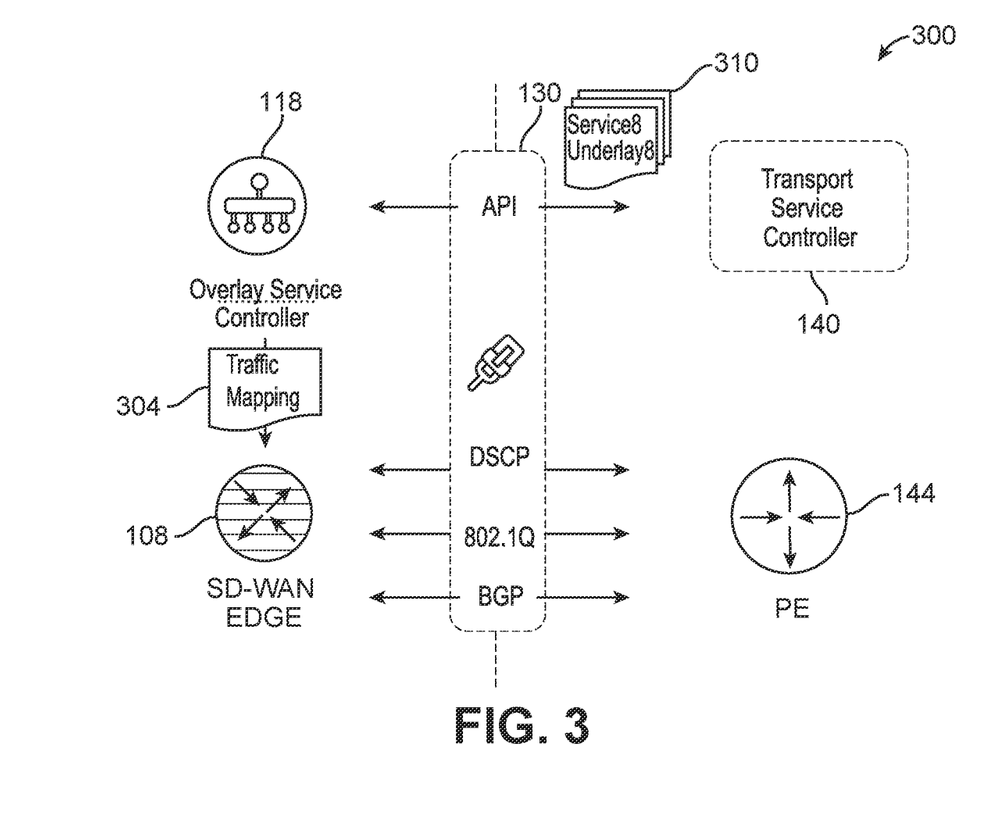
FIG. 3 illustrates an aspect of the subject matter in accordance with one aspect of this disclosure.

Overlay service controllers will discover transport services via the API-based service/attachment metadata exchange 130, implemented by the service provider or the underlay network 132. The API-based service/attachment metadata exchange 130 can provide access to information about subscribed services (such the purchased transport services 150) using a structured schema to communicate both service intent as well as service/attachment metadata. FIG. 3 illustrates the API-based service/attachment metadata exchange 130 in more detail in the context of an API-based communication of service between controllers 300. In this figure, a multi-cloud controller (e.g., an overlay service controller 118) communicates over a communication interface with a transport service controller (e.g., the underlay service controller 140) via the API-based service/attachment metadata exchange 130. Service meta-data 310 is exchanged via the API-based service/attachment metadata exchange 130. The service meta-data 310 can include data about purchased services, connections and properties (both dynamic and static data). Some examples of purchased transport services 150 can include low-latency services, gaming services, bulk-data services, geo-fencing services and diverse path services. Upon the exchange of the service meta-data 310, traffic mapping 304 can be implemented to map a transport service via an SD-WAN controller policy (e.g., implemented by a policy engine 122) based on the service meta-data 310 which can be both policy and attachment information. The WD-WAN edge 108 can be used for communication within the overlay network 106. The service meta-data 310 can be used for policy-based selection of transport services (such as an SD-WAN edge 108) over which an SD-WAN tunnel will be delivered. Data or capabilities such as a differentiated services code point (DSCP) command, 802.1Q data (which is a common encapsulation method for virtual local area network tagging) and, for example, a BGP/IPSec tunnel or other similar network tunneling method or overlay routing protocol can be provided to a provider edge 144 to achieve the tunneling and access to the underlay network 132. The approach provides for flexible mapping for transport port attachments.

The use of the methods proposed here has a number of advantages including that it is agnostic to transport service type. Client encapsulation of data and transport network encapsulation of data can be decoupled. The overlay service controller 118 or client orchestrator does not need to be aware of transport service implementation details. Furthermore, the transport service intent is known to the overlay orchestrator or overlay service controller 118, allowing programmatic control of service mapping 304 and consumption by the overlay using a graphical user interface (GUI) or Policy-as-Code (PaC) methods. The overlay clients can make of use value-added transport services from the service provider in the underlay network 132 in an agile way. Furthermore, the service provider or the underlay network 132 can monetize high value transport services for OTT clients such as SD-WAN.

Note that the example attachment 124 can include a number of different types of attachment metadata and that a service can be provided across different parts of the underlay network 132. For example, the attachment metadata 141 might include a first attachment metadata command for accessing a first portion of the underlay network 132 as part of the service, while second attachment metadata might be related to 802.1Q services which are access by a second part of the underlay network 132.

Figure 4A:
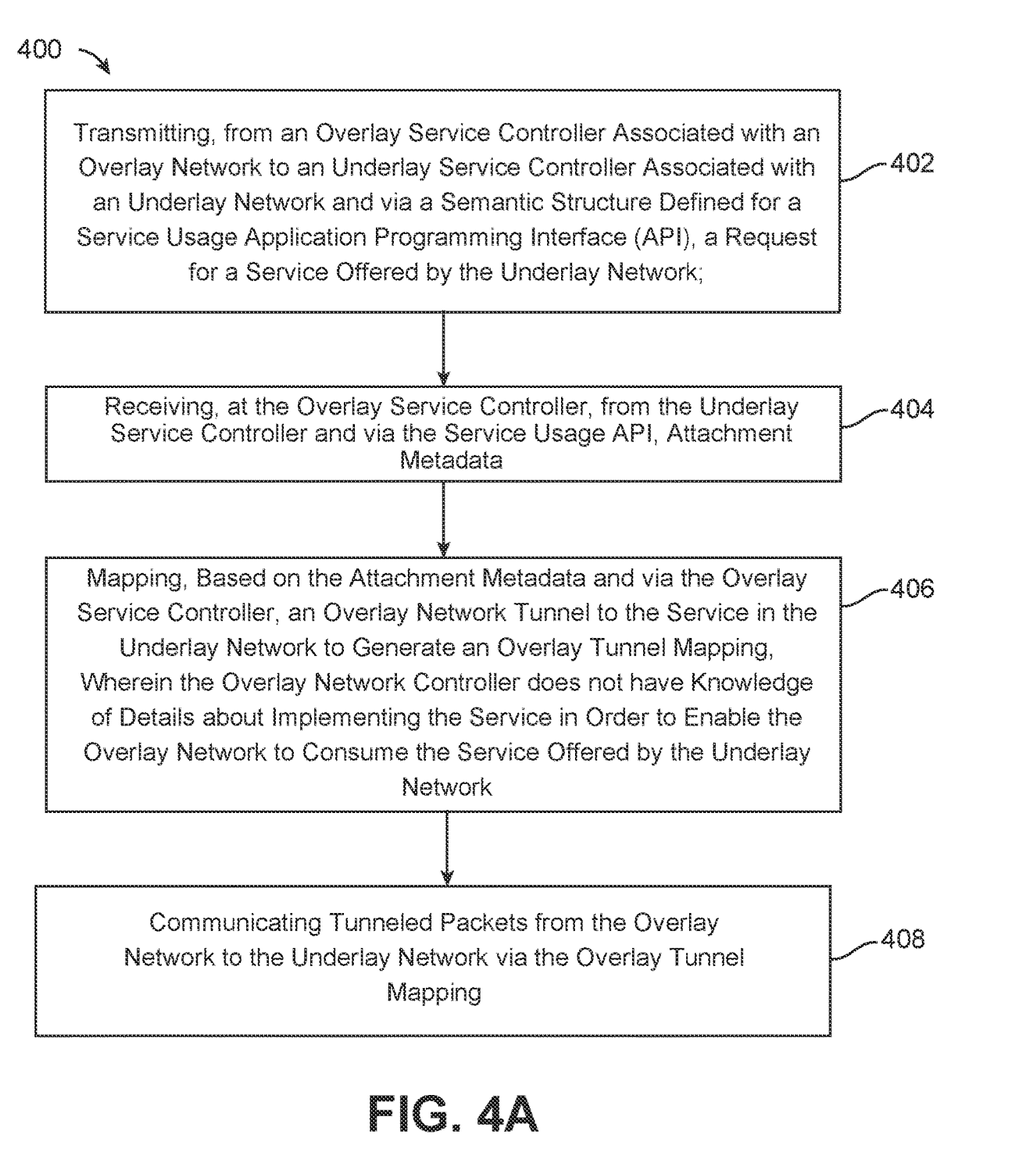
FIG. 4A illustrates an example method in accordance with one aspect of this disclosure.

FIG. 4A illustrates a method 400 of managing how to set up tunnels between an overlay layer 102 and an underlay network 132. The method 400 can include transmitting, from an overlay service controller associated with an overlay network to an underlay service controller associated with an underlay network and via a semantic structure defined for a service usage application programming interface (API), a request for a service offered by the underlay network (402), receiving, at the overlay service controller, from the underlay service controller and via the service usage API, attachment metadata (404), mapping, based on the attachment metadata and via the overlay service controller, an overlay network tunnel to the service in the underlay network to generate an overlay tunnel mapping, wherein the overlay network controller does not have knowledge of details about implementing the service in order to enable the overlay network to consume the service offered by the underlay network (406), and communicating tunneled packets from the overlay network to the underlay network via the overlay tunnel mapping (408).

In one aspect, the service can include one or more of a bulk data service, a low-latency service, a threshold-cost-based connect, a geo-fenced path service, a diverse path service, gaming, and a service-chaining service. Other services can be provided as well. The attachment metadata can include one or more of data about purchased services, connection data, properties about dynamic data or properties about static data.

In some aspects, the mapping of the overlay network tunnel to the service is accomplished via a software-defined wide area network controller policy based on the attachment metadata. The overlay network tunnel can include a software-defined wide area network tunnel. In some aspects, the method further can include selecting, based on the attachment metadata and a policy, a transport service over which the software-defined wide area network tunnel or any overlay network tunnel will be delivered.

In another aspect, the attachment metadata can be transmitted in the service usage API as a frame or packet header field. The frame or packet header field can be associated with one or more of a virtual local area network, a differentiated services code point and a proprietary field.

In some aspects, a transport service intent can be known to the overlay service controller enabling programmatic control of service mapping and consumption by the overlay network using a graphical user interface method or a policy-as-code method.

The semantic structure defined for the service usage API can be in some aspects agnostic to a service type associated with the service. The semantic structure defined for the service usage API can include a loosely-coupled model that shields the overlay service controller from needing to know implementation details associated with implementing the service.

The semantic structure defined for the service usage API enables the overlay service controller to discover underlay transport services offered by the underlay network to enable the overlay service controller to map the overlay network tunnel to the service.

In one aspect, an overlay service controller 118 associated with an overlay network can include one or more processor and a computer-readable storage medium storing instructions which, when executed by the one or more processor, cause the one or more processor to perform operations. The one or more processor can: transmit, to an underlay service controller associated with an underlay network and via a semantic structure defined for a service usage application programming interface (API), a request for a service offered by the underlay network; receive, from the underlay service controller and via the service usage API, attachment metadata; map, based on the attachment metadata, an overlay network tunnel to the service in the underlay network to generate an overlay tunnel mapping, wherein the overlay network controller does not have knowledge of details about implementing the service in order to enable the overlay network to consume the service offered by the underlay network; and communicate tunneled packets from the overlay network to the underlay network via the overlay tunnel mapping.

The service can include one or more of a bulk data service, a low-latency service, a threshold-cost-based connect, a geo-fenced path service, a diverse path service, gaming, and a service-chaining service, as well as other services. The metadata can include one or more of data about purchased services, connection data, properties about dynamic data or properties about static data. In one example, the diverse path service might, for example, require a data path to avoid a particular region or area of the network, such as China. Or, an application might require that a path between point A and point B, which might be two banks, stays in a geographic area such as Europe or a particular country.

In another example, when the system builds a tunnel, data may be sent blindly through the underlay path and the application does not know where the data is going, other than it is connecting Point A and Point B. One can discover using the concepts disclosed herein that actually between the two locations there are two paths. One path may be a low latency path and one may be a best effort path. For a critical application, the application may need to use the best effort path. The best effort path may be used for a high data volume sent from a service provider. This approach disclosed herein enables the user to map traffic to a tunnel that is a low latency path and other traffic over a best effort path.

The mapping of the overlay network tunnel to the service can be accomplished via a software-defined wide area network controller policy based on the attachment metadata. The overlay network tunnel can include a software-defined wide area network tunnel. The processor can further select, based on the attachment metadata and a policy, a transport service over which the software-defined wide area network tunnel will be delivered.

The attachment metadata can be transmitted in the service usage API as a frame or packet header field. The frame or packet header field can be associated with one or more of a virtual local area network, a differentiated services code point and a proprietary field.

A transport service intent can be known to the overlay service controller enabling programmatic control of service mapping and consumption by the overlay network using a graphical user interface method or a policy-as-code method. The semantic structure defined for the service usage API can be agnostic to a service type associated with the service. The semantic structure defined for the service usage API can include a loosely-coupled model that shields the overlay service controller from needing to know implementation details associated with implementing the service.

Figure 4B:
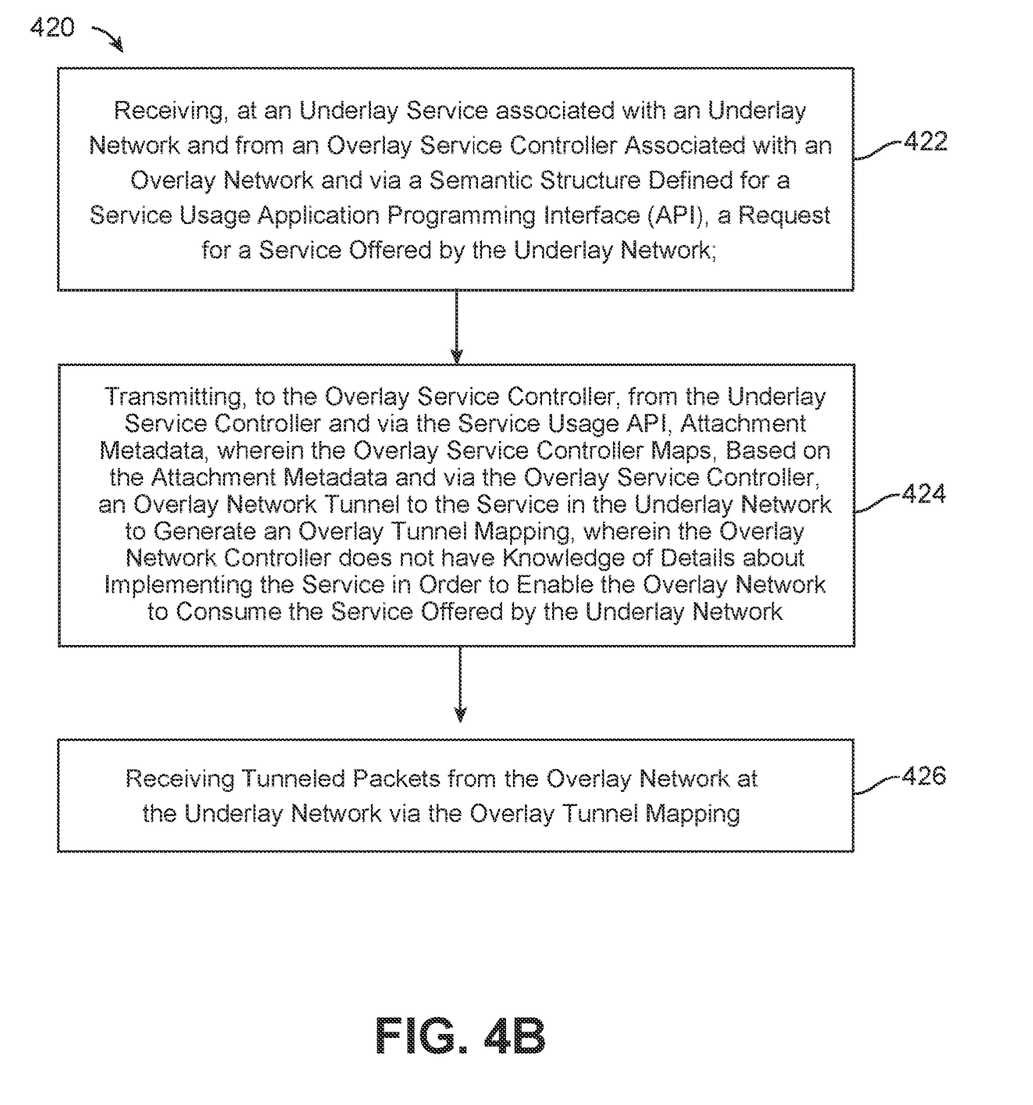
FIG. 4B illustrates another example method in accordance with one aspect of this disclosure.

FIG. 4B illustrates another method 420 from the standpoint of the underlay network 132. The method 420 can include receiving, at an underlay service controller associated with an underlay network and from an overlay service controller associated with an overlay network and via a semantic structure defined for a service usage application programming interface (API), a request for a service offered by the underlay network (422), transmitting, to the overlay service controller, from the underlay service controller and via the service usage API, attachment metadata, wherein the overlay service controller, based on the attachment metadata, maps an overlay network tunnel to the service in the underlay network to generate an overlay tunnel mapping, wherein the overlay network controller does not have knowledge of details about implementing the service in order to enable the overlay network to consume the service offered by the underlay network (424) and receiving tunneled packets from the overlay network and at the underlay network via the overlay tunnel mapping (426).

An underlay network can include an underlay service controller, one or more processor and a computer-readable storage medium storing instructions which, when executed by the one or more processor, cause the one or more processor to: receive, at the underlay service controller and from an overlay service controller associated with an overlay network and via a semantic structure defined for a service usage application programming interface (API), a request for a service offered by the underlay network; transmit, from the underlay service controller, to the overlay service controller and via the service usage API, attachment metadata, wherein the overlay service controller, based on the attachment metadata, maps an overlay network tunnel to the service in the underlay network to generate an overlay tunnel mapping, wherein the overlay network controller does not have knowledge of details about implementing the service in order to enable the overlay network to consume the service offered by the underlay network; and receive tunneled packets from the overlay network via the overlay tunnel mapping.

The disclosure proposes an API-based consumption model that allows overlay networks to discover underlay transport services at the management layer and then map overlay tunnels to specific underlay services, taking advantage of valuable SP services in a loosely-coupled model that shields the client from the implementation details of the network service making for simple integration of SP transport services.

Disclosed herein is where an application, network application controller or client controller can communicate with a network service controller. The data or any generic network service logic or mapping logic such that the client controller (i.e., the overlay service controller 118) receives information about the services managed by a network service controller (i.e., the underlay service controller 140). The application can use the services from the underlay network 132 to perform tasks for the application. The approach can enable traffic to be sent in certain ways as well as other services such as prioritizing traffic or implementing some of the services such as low latency gaming, bulk data, geo-fencing, path diversity, and so forth. An application that needs reliability may order a certain service but it may also require data to travel on a diverse path to receive information back at the application. In one example, if the application uses a certain attachment circuit, then traffic flow will be on a diverse path from the attachment circuit.

Figure 5:
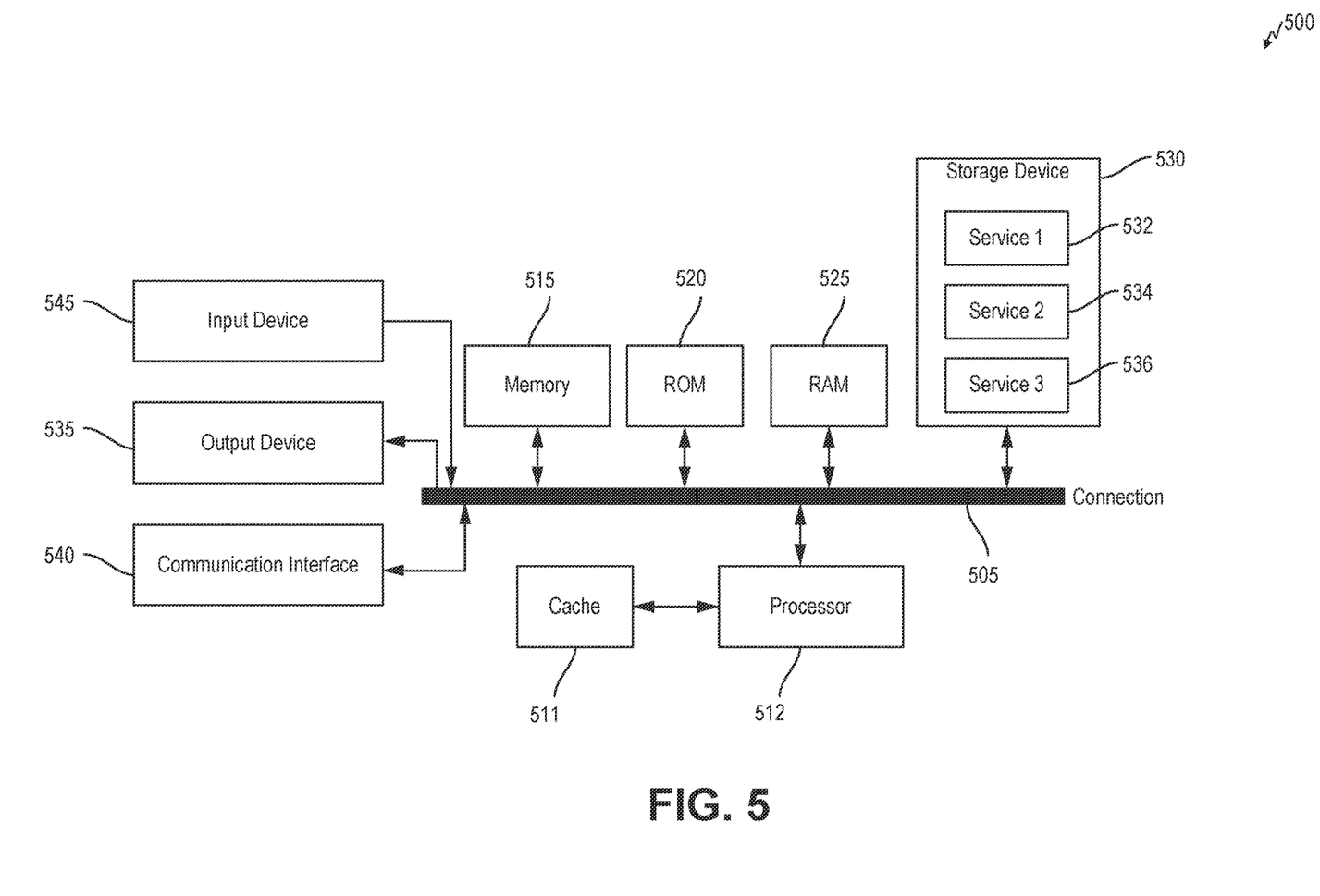
FIG. 5 shows an example of a system for implementing certain aspects of the present disclosure.

FIG. 5 shows an example of computing system 500, which can be for example any computing device making up one or more of the overlay network 106, the underlay network 132, the overlay service controller 118, the underlay service controller 140 or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random-access memory (RAM) 512 to processor 504. Computing system 500 can include a cache of high-speed memory 506 connected directly with, in close proximity to, or integrated as part of processor 504.

Processor 504 can include any general-purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks including devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can include, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can include hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim clauses associated with this application include:

Clause 1. A method comprising: transmitting, from an overlay service controller associated with an overlay network to an underlay service controller associated with an underlay network and via a semantic structure defined for a service usage application programming interface (API), a request for a service offered by the underlay network; receiving, at the overlay service controller, from the underlay service controller and via the service usage API, attachment metadata; mapping, based on the attachment metadata and via the overlay service controller, an overlay network tunnel to the service in the underlay network to generate an overlay tunnel mapping, wherein the overlay service controller does not have knowledge of details about implementing the service in order to enable the overlay network to consume the service offered by the underlay network; and communicating tunneled packets from the overlay network to the underlay network via the overlay tunnel mapping.

Clause 2. The method of clause 1, wherein the service comprises, but is not limited to, one or more of a bulk data service, a low-latency service, a threshold-cost-based connect, a geo-fenced path service, a diverse path service, gaming, and a service-chaining service.

Clause 3. The method of clause 1 or any previous clause, wherein the attachment metadata comprises one or more of data about purchased services, connection data, properties about dynamic data or properties about static data.

Clause 4. The method of clause 1 or any previous clause, wherein the mapping of the overlay network tunnel to the service is accomplished via a software-defined wide area network controller policy (or any overlay network controller policy) based on the attachment metadata.

Clause 5. The method of clause 1 or any previous clause, wherein the overlay network tunnel comprises a software-defined wide area network tunnel (or any overlay network tunnel) and the method further comprising: selecting, based on the attachment metadata and a policy, a transport service over which the software-defined wide area network tunnel will be delivered.

Clause 6. The method of clause 1 or any previous clause, wherein the metadata is transmitted in the service usage API in a frame or packet header field.

Clause 7. The method of clause 6 or any previous clause, wherein the frame or packet header field is associated with one or more of, but not limited to, a virtual local area network, a differentiated services code point and a proprietary field and other keys.

Clause 8. The method of clause 1 or any previous clause, wherein a transport service intent is known to the overlay service controller enabling programmatic control of service mapping and consumption by the overlay network using a graphical user interface method or a policy-as-code method.

Clause 9. The method of clause 1 or any previous clause, wherein the semantic structure defined for the service usage API is agnostic to a service type associated with the service.

Clause 10. The method of clause 1 or any previous clause, wherein the semantic structure defined for the service usage API comprises a loosely-coupled model that shields the overlay service controller from needing to know implementation details associated with implementing the service.

Clause 11. The method of clause 1 or any previous clause, wherein the semantic structure defined for the service usage API enables the overlay service controller to discover underlay transport services offered by the underlay network to enable the overlay service controller to map the overlay network tunnel to the service.

Clause 12. An overlay service controller associated with an overlay network comprising: one or more processor; and a computer-readable storage medium storing instructions which, when executed by the one or more processor, cause the one or more processor to: transmit, to an underlay service controller associated with an underlay network and via a semantic structure defined for a service usage application programming interface (API), a request for a service offered by the underlay network; receive, from the underlay service controller and via the service usage API, attachment metadata; map, based on the attachment metadata, an overlay network tunnel to the service in the underlay network to generate an overlay tunnel mapping, wherein the overlay service controller does not have knowledge of details about implementing the service in order to enable the overlay network to consume the service offered by the underlay network; and communicate tunneled packets from the overlay network to the underlay network via the overlay tunnel mapping.

Clause 13. The overlay service controller of clause 12, wherein the service comprises one or more of, but not limited to, a bulk data service, a low-latency service, a threshold-cost-based connect, a geo-fenced path service, a diverse path service, gaming, and a service-chaining service as well as other services.

Clause 14. The overlay service controller of clause 12 or any previous clause, wherein the metadata comprises one or more of, but not limited to, data about purchased services, connection data, properties about dynamic data or properties about static data.

Clause 15. The overlay service controller of clause 12 or any previous clause, wherein when the one or more processor maps the overlay network tunnel to the service by a software-defined wide area network controller policy based on the metadata.

Clause 16. The overlay service controller of clause 12 or any previous clause, wherein the overlay network tunnel comprises a software-defined wide area network tunnel, or any overlay tunnel, and the computer-readable storage medium stores additional instructions which, when executed by the one or more processor, cause the one or more processor to: select, based on the metadata and a policy, a transport service over which the software-defined wide area network tunnel will be delivered.

Clause 17. The overlay service controller of clause 12 or any previous clause, wherein the attachment metadata is transmitted in the service usage API as a frame or packet header field.

Clause 18. The overlay service controller of clause 17 or any previous clause, wherein the frame or packet header field is associated with one or more of, but not limited to, a virtual local area network, a differentiated services code point and a proprietary field or other keys.

Clause 19. The overlay service controller of clause 12 or any previous clause, wherein: a transport service intent is known to the overlay service controller enabling programmatic control of service mapping and consumption by the overlay network using a graphical user interface method or a policy-as-code method; the semantic structure defined for the service usage API is agnostic to a service type associated with the service; and the semantic structure defined for the service usage API comprises a loosely-coupled model that shields the overlay service controller from needing to know implementation details associated with implementing the service.

Clause 20. A method comprising: receiving, at an underlay service controller associated with an underlay network and from an overlay service controller associated with an overlay network and via a semantic structure defined for a service usage application programming interface (API), a request for a service offered by the underlay network; transmitting, to the overlay service controller, from the underlay service controller and via the service usage API, attachment metadata, wherein the overlay service controller, based on the attachment metadata, maps an overlay network tunnel to the service in the underlay network to generate an overlay tunnel mapping, wherein the overlay service controller does not have knowledge of details about implementing the service in order to enable the overlay network to consume the service offered by the underlay network; and receiving tunneled packets from the overlay network and at the underlay network via the overlay tunnel mapping.

Clause 21. An underlay network comprising: an underlay service controller; one or more processor; and a computer-readable storage medium storing instructions which, when executed by the one or more processor, cause the one or more processor to: receive, at the underlay service controller and from an overlay service controller associated with an overlay network and via a semantic structure defined for a service usage application programming interface (API), a request for a service offered by the underlay network; transmit, from the underlay service controller, to the overlay service controller and via the service usage API, attachment metadata, wherein the overlay service controller, based on the attachment metadata, maps an overlay network tunnel to the service in the underlay network to generate an overlay tunnel mapping, transmit, from the underlay service controller, to the overlay service controller and via the service usage API, attachment metadata, wherein the overlay service controller, based on the attachment metadata, maps an overlay network tunnel to the service in the underlay network to generate an overlay tunnel mapping, wherein the attachment metadata is configured to be associated with a given service which can be at different parts of the underlay network; and receive tunneled packets from the overlay network via the overlay tunnel mapping.

Clause 22. A method comprising: transmitting, from an overlay service controller associated with an overlay network to an underlay service controller associated with an underlay network and via a semantic structure defined for a service usage application programming interface (API), a request for a service offered by the underlay network; receiving, at the overlay service controller, from the underlay service controller and via the service usage API, attachment metadata; mapping, based on the attachment metadata and via the overlay service controller, an overlay network tunnel to the service in the underlay network to generate an overlay tunnel mapping, wherein the attachment metadata comprises first attachment metadata associated with a first part of the underlay network and second attachment metadata associated with a second part of the underlay network; and communicating tunneled packets from the overlay network to the underlay network via the overlay tunnel mapping.

Clause 23. The method of clause 22 or any previous clause, wherein the first attachment metadata is associated with differentiated services code point (DSCP) values on the first part of the underlay network and the second attachment metadata is associated with a virtual large area network (VLAN) circuit on the second part of the underlay network.

Clause 24. An overlay service controller associated with an overlay network comprising: one or more processor; and a computer-readable storage medium storing instructions which, when executed by the one or more processor, cause the one or more processor to: transmit, to an underlay service controller associated with an underlay network and via a semantic structure defined for a service usage application programming interface (API), a request for a service offered by the underlay network; receive from the underlay service controller and via the service usage API, attachment metadata; map, based on the attachment metadata, an overlay network tunnel to the service in the underlay network to generate an overlay tunnel mapping, wherein the attachment metadata comprises first attachment metadata associated with a first part of the underlay network and second attachment metadata associated with a second part of the underlay network; and communicate tunneled packets to the underlay network via the overlay tunnel mapping.

Clause 25. The overlay service controller of clause 24 or any previous clause, wherein the first attachment metadata is associated with differentiated services code point (DSCP) values on the first part of the underlay network and the second attachment metadata is associated with a virtual large area network (VLAN) circuit on the second part of the underlay network.

What is claimed is:

1. A method comprising:
    transmitting, from an overlay service controller associated with an overlay network to an underlay service controller associated with an underlay network and via a semantic structure defined for a service usage application programming interface (API), a request for a service offered by the underlay network;
    receiving, at the overlay service controller, from the underlay service controller and via the service usage API, attachment metadata;
    mapping, based on the attachment metadata and via the overlay service controller, an overlay network tunnel to the service in the underlay network to generate an overlay tunnel mapping, wherein the overlay service controller does not have knowledge of details about implementing the service in order to enable the overlay network to consume the service offered by the underlay network, wherein the semantic structure defined for the service usage API comprises a loosely-coupled model that shields the overlay service controller from needing to know implementation details associated with implementing the service and enables the overlay service controller to discover underlay transport services offered by the underlay network to enable the overlay service controller to map the overlay network tunnel to the service; and communicating tunneled packets from the overlay network to the underlay network via the overlay tunnel mapping.

2. The method of claim 1, wherein the service comprises one or more of a bulk data service, a low-latency service, a threshold-cost-based connect, a geo-fenced path service, a diverse path service, gaming, and a service-chaining service.

3. The method of claim 1, wherein the attachment metadata comprises one or more of data about purchased services, connection data, properties about dynamic data or properties about static data.

4. The method of claim 1, wherein the mapping of the overlay network tunnel to the service is accomplished via a software-defined wide area network controller policy or any overlay network controller policy based on the attachment metadata.

5. The method of claim 1, wherein the overlay network tunnel comprises a software-defined wide area network tunnel or any overlay network tunnel and the method further comprising:

selecting, based on the attachment metadata and a policy, a transport service over which the software-defined wide area network tunnel or any overlay network tunnel will be delivered.

6. The method of claim 1, wherein the attachment metadata is transmitted in the service usage API as a frame or packet header field.

7. The method of claim 6, wherein the frame or packet header field is associated with one or more of a virtual local area network, a differentiated services code point and a proprietary field.

8. The method of claim 1, wherein a transport service intent is known to the overlay service controller enabling programmatic control of service mapping and consumption by the overlay network using a graphical user interface method or a policy-as-code method.

9. The method of claim 1, wherein the semantic structure defined for the service usage API is agnostic to a service type associated with the service.

10. An overlay service controller associated with an overlay network comprising:

one or more processor; and a computer-readable storage medium storing instructions which, when executed by the one or more processor, cause the one or more processor to: transmit, to an underlay service controller associated with an underlay network and via a semantic structure defined for a service usage application programming interface (API), a request for a service offered by the underlay network;

receive, from the underlay service controller and via the service usage API, attachment metadata;

map, based on the attachment metadata, an overlay network tunnel to the service in the underlay network to generate an overlay tunnel mapping, wherein the overlay service controller does not have knowledge of details about implementing the service in order to enable the overlay network to consume the service offered by the underlay network, wherein the semantic structure defined for the service usage API comprises a loosely-coupled model that shields the overlay service controller from needing to know implementation details associated with implementing the service and enables the overlay service controller to discover underlay transport services offered by the underlay network to enable the overlay service controller to map the overlay network tunnel to the service; and communicate tunneled packets from the overlay network to the underlay network via the overlay tunnel mapping.

11. The overlay service controller of claim 10, wherein the service comprises one or more of a bulk data service, a low-latency service, a threshold-cost-based connect, a geo-fenced path service, a diverse path service, gaming, and a service-chaining service.

12. The overlay service controller of claim 10, wherein the attachment metadata comprises one or more of data about purchased services, connection data, properties about dynamic data or properties about static data.

13. The overlay service controller of claim 10, wherein when the one or more processor maps the overlay network tunnel to the service by a software-defined wide area network controller policy based on the attachment metadata.

14. The overlay service controller of claim 10, wherein the overlay network tunnel comprises a software-defined wide area network tunnel or any overlay network tunnel.

15. The overlay service controller of claim 14, wherein the computer-readable storage medium stores additional instructions which, when executed by the one or more processor, cause the one or more processor to: select, based on the attachment metadata and a policy, a transport service over which the software-defined wide area network tunnel or any overlay network tunnel will be delivered.

16. The overlay service controller of claim 10, wherein the semantic structure defined for the service usage API is agnostic to a service type associated with the service.

17. An underlay network comprising:

an underlay service controller;

one or more processor; and a computer-readable storage medium storing instructions which, when executed by the one or more processor, cause the one or more processor to:

receive, at the underlay service controller and from an overlay service controller associated with an overlay network and via a semantic structure defined for a service usage application programming interface (API), a request for a service offered by the underlay network;

transmit, from the underlay service controller, to the overlay service controller and via the service usage API, attachment metadata, wherein the overlay service controller, based on the attachment metadata, map an overlay network tunnel to the service in the underlay network to generate an overlay tunnel mapping, wherein the attachment metadata is configured to be associated with a given service which can be at different parts of the underlay network, wherein the semantic structure defined for the service usage API comprises a loosely-coupled model that shields the overlay service controller from needing to know implementation details associated with implementing the service and enables the overlay service controller to discover underlay transport services offered by the underlay network to enable the overlay service controller to map the overlay network tunnel to the service; and receive tunneled packets from the overlay network via the overlay tunnel mapping.

* * * * *